(12) United States Patent
Millar et al.

(10) Patent No.: US 10,554,309 B2
(45) Date of Patent: Feb. 4, 2020

(54) PILOT-AIDED CARRIER PHASE ESTIMATION FOR OPTICAL COMMUNICATIONS

(71) Applicant: Mitsubishi Electric Research Laboratories, Inc., Cambridge, MA (US)

(72) Inventors: David Millar, Concord, MA (US); Milutin Pajovic, Cambridge, MA (US); Toshiaki Koike-Akino, Belmont, MA (US); Keisuke Kojima, Weston, MA (US); Kieran Parsons, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 15/874,074

(22) Filed: Jan. 18, 2018

(65) Prior Publication Data
US 2019/0222321 A1 Jul. 18, 2019

(51) Int. Cl.
*H04B 10/61* (2013.01)
*H04L 7/00* (2006.01)
*H04B 10/079* (2013.01)

(52) U.S. Cl.
CPC ... *H04B 10/6165* (2013.01); *H04B 10/07955* (2013.01); *H04L 7/0029* (2013.01)

(58) Field of Classification Search
CPC .......... H04B 10/6165; H04B 10/07955; H04L 7/0029
See application file for complete search history.

(56) References Cited

U.S. PATENT DOCUMENTS

| | | | |
|---|---|---|---|
| 9,306,676 B1* | 4/2016 | Castrillon | H04B 10/6165 |
| 2011/0021704 A9 | 1/2011 | Tse et al. | |
| 2012/0155887 A1* | 6/2012 | Youn | H04B 10/0775 398/182 |
| 2013/0089341 A1 | 4/2013 | Roberts et al. | |
| 2013/0329834 A1 | 12/2013 | Zhou | |
| 2014/0010532 A1 | 1/2014 | Zhang et al. | |

(Continued)

FOREIGN PATENT DOCUMENTS

| | | |
|---|---|---|
| EP | 2806584 | 5/2013 |
| EP | 2930865 | 4/2014 |

(Continued)

*Primary Examiner* — Mina M Shalaby
(74) *Attorney, Agent, or Firm* — Gennadiy Vinokur; James McAleenan; Hironori Tsukamoto

(57) ABSTRACT

A method decodes an optical signal transmitted over an optical channel from a transmitter to a receiver. The method produces, from the transmitted optical signal, a digital signal including received data symbols and received pilot symbols and determines phase noise on the pilot symbols using a statistical probability distribution of phase noise on the optical channel and errors between phases of the received pilot symbols and the transmitted pilot signals. The method estimates phase noise on the data symbols using an interpolation of the phase noise on the pilot symbols and compensates the digital signal with the phase noise on the data symbols to produce a filtered signal with an equalized phase. The method demodulates and decodes the filtered signal to produce an estimate of the transmitted optical signal.

19 Claims, 9 Drawing Sheets

(56) References Cited

U.S. PATENT DOCUMENTS

| | | | | |
|---|---|---|---|---|
| 2015/0188642 A1* | 7/2015 | Sun | H04B 10/6165 | |
| | | | 398/202 | |
| 2015/0372766 A1* | 12/2015 | Yoshida | H04B 10/2507 | |
| | | | 398/193 | |
| 2016/0269110 A1* | 9/2016 | Dahan | H04B 10/0793 | |
| 2016/0277121 A1* | 9/2016 | Millar | H04B 10/6972 | |
| 2017/0134120 A1* | 5/2017 | Calabro | H04B 10/548 | |
| 2017/0338893 A1* | 11/2017 | Cavaliere | H04B 10/616 | |
| 2017/0373910 A1* | 12/2017 | Shahmohammadian | ............... | |
| | | | H04L 5/0048 | |
| 2018/0069626 A1* | 3/2018 | Zhao | H04B 10/616 | |
| 2018/0269985 A1* | 9/2018 | Zhu | H04B 10/6165 | |

FOREIGN PATENT DOCUMENTS

| | | |
|---|---|---|
| JP | 20160148158 A1 | 9/2016 |
| RU | 2626246 C1 | 7/2017 |

* cited by examiner

PILOT-AIDED CARRIER PHASE ESTIMATION FOR OPTICAL COMMUNICATIONS

TECHNICAL FIELD

This invention relates generally to coherent optical communications systems, and more particularly to decoding data transmitted over an optical channel.

BACKGROUND

Inaccuracies in carrier-phase estimation and amplitude equalization cause distortions, i.e., the noise enhancements, which reduce the performance of optical communications systems. In the optical communications, different algorithms are used to reduce the distortion. Those algorithms are based on a hard decision for determining the phase and amplitude of the received signal. For example, a decision-directed least-mean-square (LMS) method uses the hard decision for determining the error for the updating.

However, the hard decisions can be incorrect causing suboptimal phase and amplitude equalization. The problem of inaccuracy of the hard decisions is especially apparent in the applications with low signal-to-noise ratios (SNR). However, for each fixed SNR, there is a need to further improve the data throughput and other performance metrics of optical communications, such as spectral efficiency of the transmitted signal.

In order to provide higher optical interface rates, recent research has focused on the expansion of both bandwidth and spectral efficiency. While some researches have focused on the slicing of the received signals in the time or frequency domains, these solutions require several parallel coherent receivers. Current results using a single coherent receiver have exceeded 640 Gb/s net bit rate. However, there is a demand to provide a system and a method for detection of a net bit rate in excess of 1 Tb/s with a single coherent receiver.

Detection of the bit rates in excess of 1 Tb/s with a single receiver requires accurate demodulation of the signals. To demodulate signals in an optical communications system, it is necessary to equalize distortions to both phase and amplitude of the received signals, caused by the optical and electrical components. This is particularly difficult for densely modulated signals with high-order quadrature-amplitude modulation (QAM), such as 64-QAM and 256-QAM.

For equalization of phase distortions, conventional systems can use a blind phase search approach, see, e.g., U.S. 2011/0217043. However, that approach has a high complexity for densely modulated signals and suffers from poor performance in a low SNR regime.

SUMMARY

Some embodiments are based on realization that pilot-aided equalization can be advantageously used for optical signals, especially for the equalization of the densely modulated optical signals, such as dual-polarization (DP) 64QAM and DP-256QAM. This is because the decrease of the bit rate due to the pilot symbols can be compensated by the increase of the modulation order of the optical signals due to more accurate equalization of the optical signals.

Some embodiments are based on recognition that the phases of the optical signals are rapidly changing and are subject to phase noise and additive noise, so just comparisons of the phases of pilot symbols do not provide accurate results. Due to the physical nature of the optical channel, the phases of the received pilot symbols depend on phases of other received symbols including other pilot symbols. Therefore, by collectively considering the multitude of phases of the received pilot symbols, that dependency can be used to estimate the phase of the data symbols.

Some embodiments are based on recognition that it is possible to use the knowledge of the probability distribution of the pilot symbols to determine the probability distribution of phases of the data signals. The probability distribution of phases of the data signals can be used to determine the phases of the data signals. However, the operations in the domain of the statistical properties of the transmitted signal requires a computationally expensive calculation.

Some embodiments are based on realization that the operations in the domain of the statistical properties can be reduced with analytical approximations. For example, some embodiments are based on realization that the interpolation of the phase noise on the pilot symbols provide accurate estimation of the phase noise on the data symbols, which much lower complexity of calculation.

One embodiment is based on another recognition that the accuracy of such interpolation depends on signal-to-noise ratio (SNR) and/or level of phase noise. For example, the accuracy of the interpolation increases with the increase of the SNR and decrease of the level of phase noise. However, it is possible to further refine the interpolated estimation of the phase noise. To that end, the interpolation of the phase noise combined with the subsequent refinement can lead to a practical estimation of the phase noise with practical computational complexity. For example, the embodiment determines a residual error between a phase of the received data symbol with equalized phase and a phase of the most likely transmitted data symbol given the received data symbol with equalized phase and refines the estimate of the phase noise on the data symbols based on the residual error. Such a refinement requires less computational steps than determination of the phase noise using statistical distribution.

Accordingly, one embodiment discloses a method for decoding an optical signal transmitted over an optical channel from a transmitter to a receiver. The method includes receiving the transmitted optical signal; producing, from the transmitted optical signal, a digital signal including received data symbols and received pilot symbols; determining phase noise on the pilot symbols using a statistical probability distribution of phase noise on the optical channel and errors between phases of the received pilot symbols and the transmitted pilot signals; estimating phase noise on the data symbols using an interpolation of the phase noise on the pilot symbols; compensating the digital signal with the phase noise on the data symbols to produce a filtered signal with an equalized phase; and demodulating and decoding the filtered signal to produce an estimate of the transmitted optical signal, wherein at least some steps of the method are performed using a processor of the receiver.

Another embodiment discloses a receiver for decoding an optical signal transmitted by a transmitter over an optical channel, including a front end to receive the transmitted optical signal to produce a digital signal including data symbols and pilot symbols; a phase equalizer to determine phase noise on the data symbols using interpolation of phase noise on the pilot symbols and to compensate the phase noise on the data symbols in the digital signal with to produce a filtered signal with an equalized phase; and a decoder to demodulate and decode the filtered signal to produce an estimate of the transmitted optical signal.

Yet another embodiment discloses a non-transitory computer readable storage medium embodied thereon a program executable by a processor for performing a method, the method includes receiving a digital signal representing an optical signal transmitted over an optical channel, the digital signal including received data symbols and received pilot symbols; determining phase noise on the pilot symbols using a statistical probability distribution of phase noise on the optical channel and errors between phases of the received pilot symbols and the transmitted pilot signals; estimating phase noise on the data symbols using an interpolation of the phase noise on the pilot symbols; compensating the digital signal with the phase noise on the data symbols to produce a filtered signal with an equalized phase; and demodulating and decoding the filtered signal to produce an estimate of the transmitted optical signal.

DETAILED DESCRIPTION

Figure 1A:
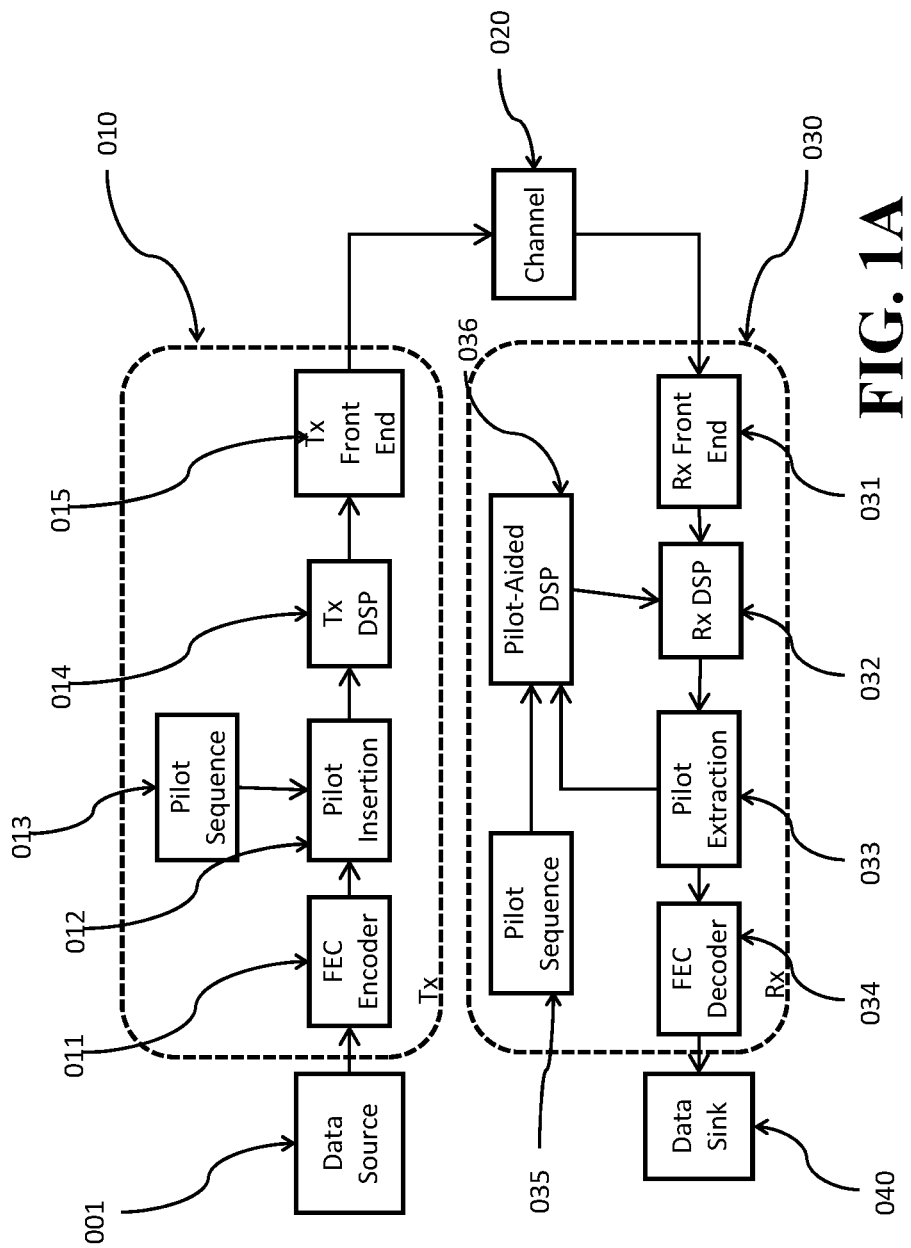
FIG. 1A is a block diagram of a pilot-aided optical communication system according to some embodiments of the invention.

FIG. 1A shows a block diagram of a pilot-aided optical communication system according to some embodiments of the invention. Data from a source (001) is sent to a transmitter (Tx) (010). For example, the data is first sent to an optional forward error correction (FEC) encoder (011) and then the data is sent to a pilot insertion block (012), where pilot symbols from the pilot sequence (013) are added intermittently at some pre-determined rate to produce a signal including a set of data symbols and a set of pilot symbols with known amplitudes and phases. After pilot insertion, the signal undergoes digital signal processing (DSP) (014). In some embodiments, DSP also performs other function such as mapping, filtering and pre-equalization. The signal is then sent to the transmitter front end (015), where analog operations such as amplification, filtering, modulation and up-conversion occur, and then transmitted over an optical channel (020) to a receiver (Rx) (030).

At the receiver, the signal first passes through the receiver front end (031) for performing analog operations such as down-conversion, amplification, filtering and quantization of the received signal to produce a digital signal. The digital signal is processed by digital algorithms (032) for functions such as front-end correction and chromatic dispersion compensation, before extraction of the received pilot symbols (033). The extracted pilot symbols are then processed in combination with the transmitted pilot sequence (035) with known amplitudes and phases corresponding to the pilot symbols (013), by the pilot-aided DSP algorithms (036). Information resulting from this processing is then used in the receiver DSP (032) in order to improve accuracy of the equalization and carrier recovery. The received signal after pilot extraction is then optionally sent for FEC decoding (034), before being sent on to its destination, e.g., the data sink (040).

Figure 1B:
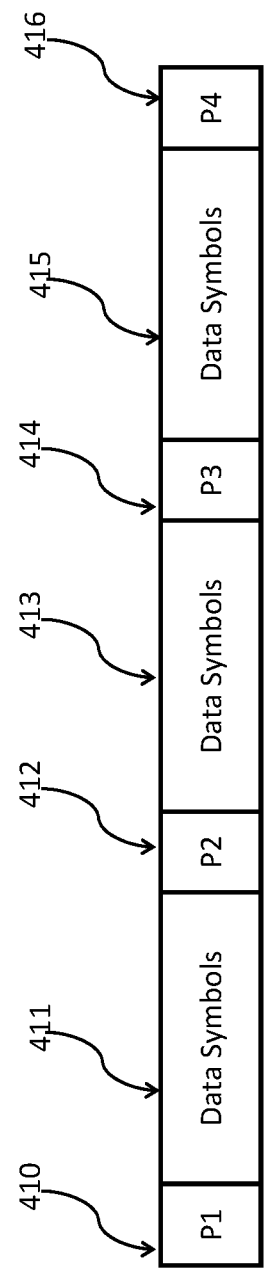
FIG. 1B is an exemplar structure of the signal including a set of data symbols and a set of pilot symbols with known amplitudes and phases according to some embodiments of the invention.

FIG. 1B shows an exemplar structure of the signal including a set of data symbols and a set of pilot symbols with known amplitudes and phases according to some embodiments of the invention. Several pilot symbols (410, 412, 414, and 416) are distributed through several blocks of data symbols (411, 413, and 415). Digital signal processing on a single block of data symbols (413) can be performed using adjacent pilot symbols (412, 414) and/or nonadjacent pilot symbols (410, 416).

Figure 1C:
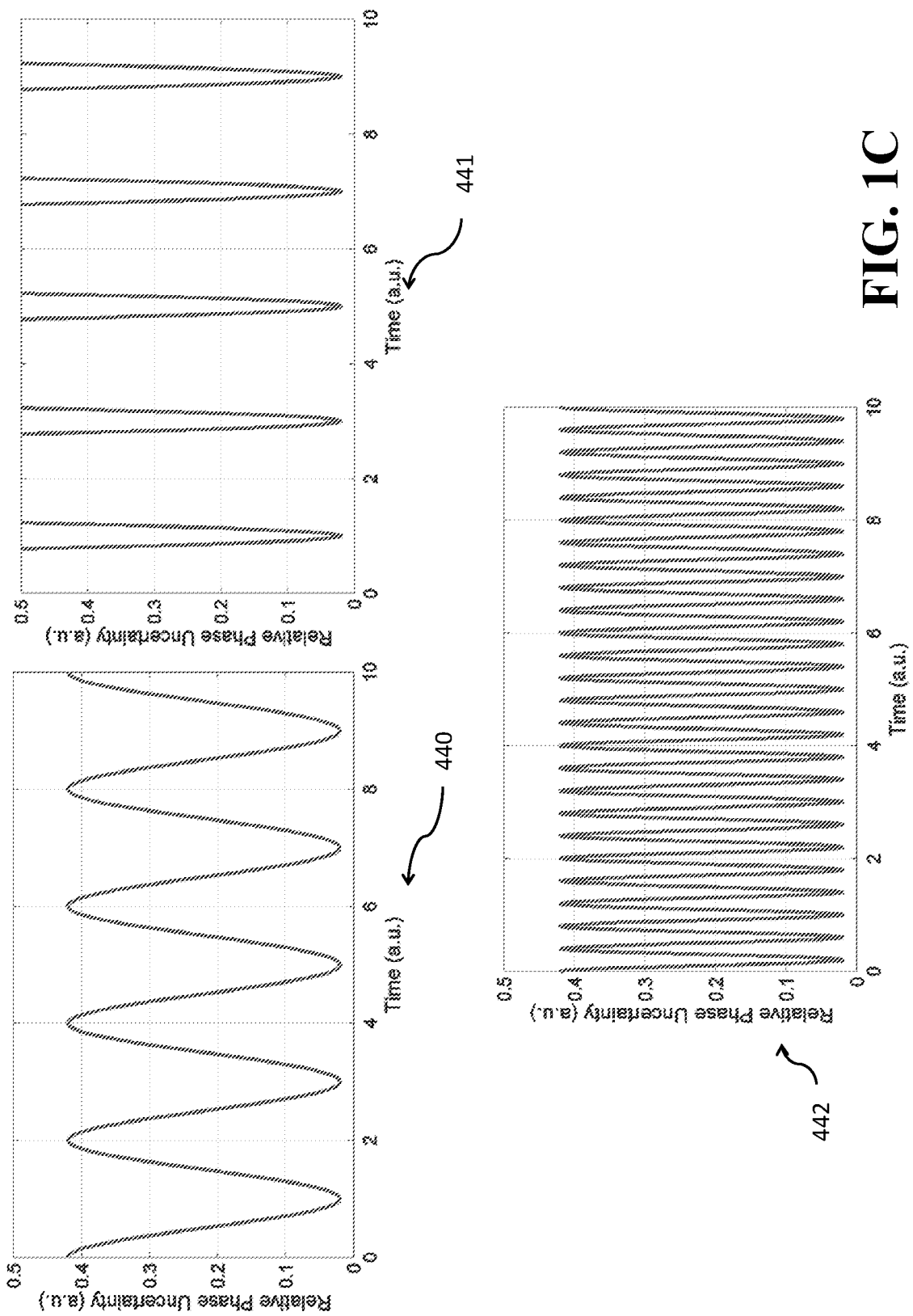
FIG. 1C is a set of diagrams illustrating typical estimator performance under varying relative phase noise and pilot insertion ratios.

FIG. 1C shows schematics of the relative phase estimation performance in systems with different levels of phase noise and different pilot insertion ratios. In a case with low phase noise and a low pilot insertion ratio (that is, less frequent pilot symbols) (440), the relative uncertainty in the phase estimate is lowest when a pilot symbol is present (although it never achieves zero estimation error), and at a maximum when equally distant from two adjacent pilots. When the relative phase noise is high and the pilot insertion ratio is low (441), the same low uncertainty can be achieved at the location of pilot symbols, but in the areas away from the pilot symbols, performance can be very poor. By increasing the pilot insertion ratio with higher relative phase noise (442), we can achieve similar performance to the low phase noise case, at a cost of increasing the pilot insertion ratio, which may be considered as an overhead.

Figure 1D:
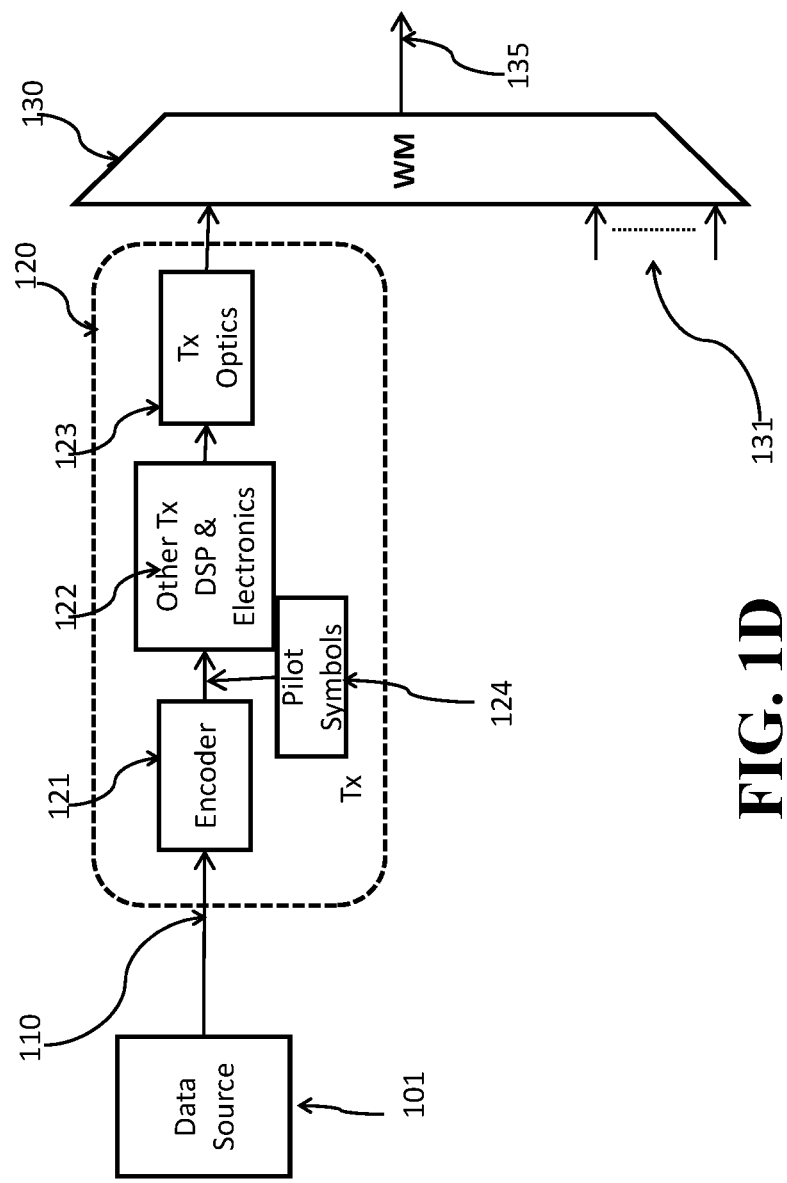
FIG. 1D is a block diagram of a transmitter for a pilot-aided optical communication system according to one embodiment of the invention.

FIG. 1D shows a block diagram of a transmitter for a pilot-aided optical communication system according to one embodiment of the invention. Data (110) from a source (101) is sent to a transmitter (120). In the transmitter, the data is first encoded by an FEC encoder (121), before pilot symbols (124) are inserted intermittently. The signal then undergoes processing with DSP algorithms and other front end electronics (122) such as analog-to-digital convertors. The signal is then sent to the transmitter optics (123) for modulation on to the optical carrier. The optical signal is then sent to a wavelength multiplexer (WM) (130), where the signal can be optionally combined with other optical signals which have different wavelengths (131), before being sent to the optical channel (135).

Figure 1E:
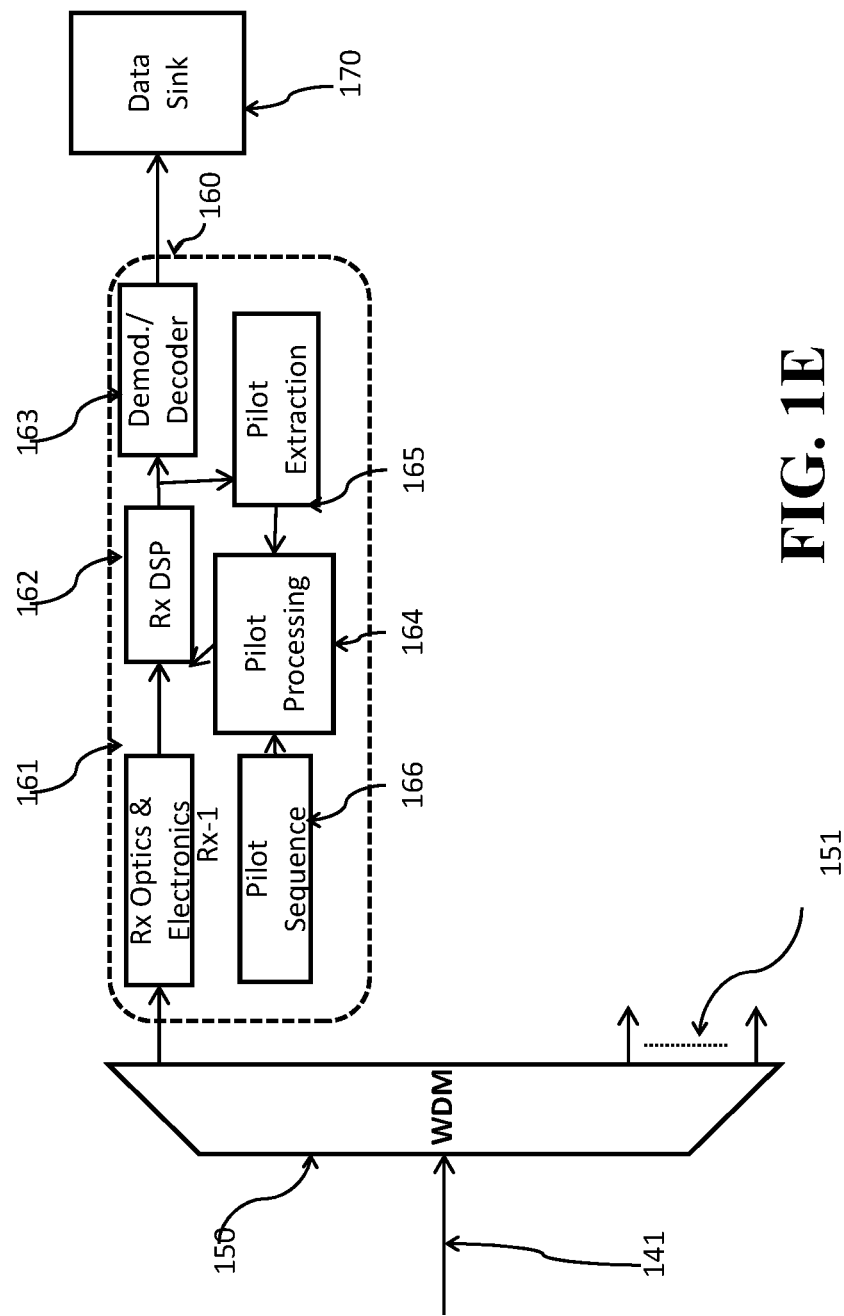
FIG. 1E is a block diagram of a receiver the pilot-aided optical communication system according to one embodiment of the invention.

FIG. 1E shows a block diagram of a receiver the pilot-aided optical communication system according to one embodiment of the invention. The signal from the optical channel (141) is firstly sent to a wavelength de-multiplexer (WDM) (150). Other wavelengths (151) are optionally sent to other receivers for processing independently of the wavelength channel of interest. The signal is then sent to the receiver (160). Firstly, the optical signal is detected by the optical receiver front end (161). This block can include both optical and electronic elements, such as down-conversion, amplification, and quantization. The digital signal is then processed by DSP algorithms (162). After DSP processing, the received pilot symbols are extracted (165), and processed (164) in combination with the known transmitted pilot sequence (166) of pilot symbols. Information from this pilot processing is then used in the Rx DSP (162) that includes an equalizer for functions such as amplitude and phase equalization. The processed signal is then sent for demodulation module (163) for demodulation and FEC decoding, before being sent to its final destination, the data sink (170).

Phase Estimation Using Only Pilot Symbols

Some embodiments of the invention are based on general realization that for optical communications a first estimation of carrier phase using only pilot symbols can provide a good estimate of carrier phase for certain levels of phase noise and additive noise.

Figure 2A:
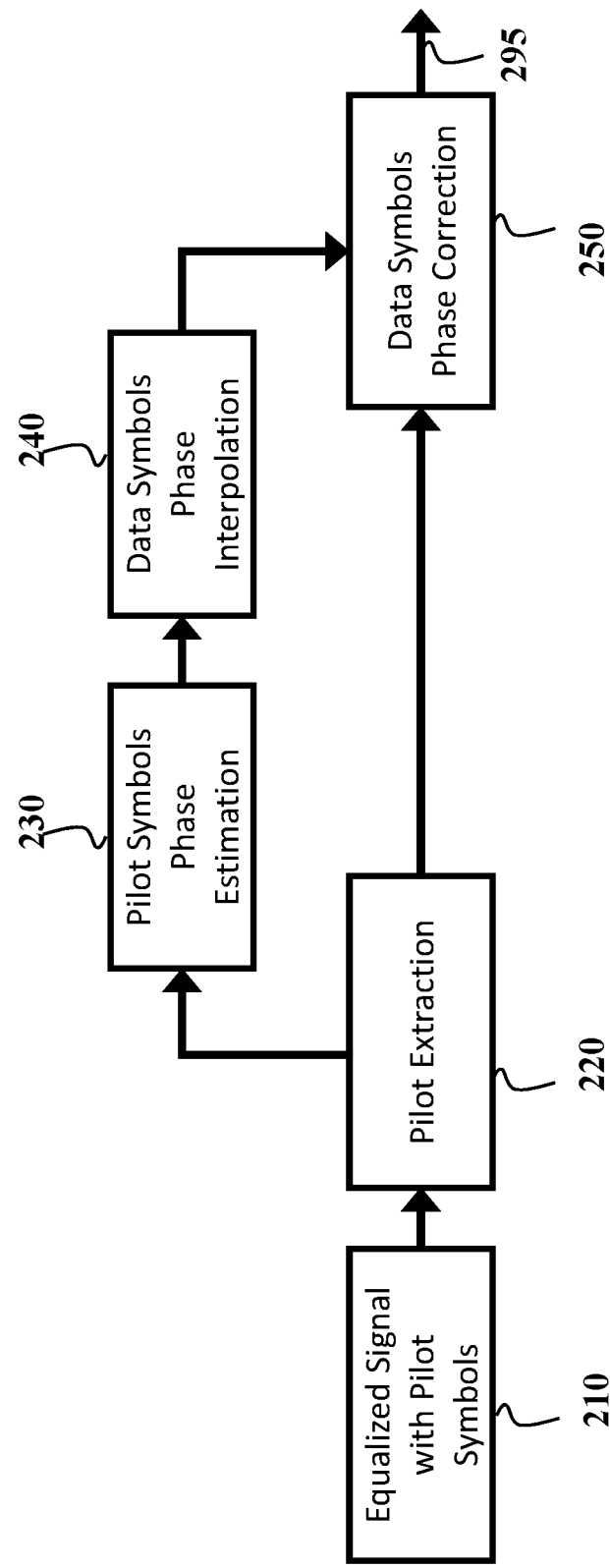
FIG. 2A is a block diagram of a method for estimating carrier phase using only the pilot symbols according to some embodiments of the invention.

FIG. 2A shows a block diagram of a method for estimating the carrier phase of an optical communication system using only pilot symbols. The method receives an equalized signal 210, containing both information symbols and pilot symbols. The pilot symbols are extracted 220, for subsequent processing. The phases of pilot symbols are then estimated 230 either individually, or using some joint estimation scheme. The phase of the data symbols is then inferred from the phase of the pilot symbols 240 using the estimated pilot symbol phases, knowledge of the channel statistics, and the distribution of the pilot symbols throughout the incoming signal 210. The phase of the data symbols is then corrected 250 with this initial estimated phase, before the phase-corrected signal 295 is output for subsequent processing such as demodulation and decoding.

For example, an optical signal is transmitted over an optical channel from a transmitter to a receiver, producing, from the transmitted optical signal, a digital signal including received data symbols and received pilot symbols (210). Pilot symbols are then extracted from the received signal (220), for the purpose of determining phase noise on the pilot symbols (230) using a statistical probability distribution of phase noise on the optical channel and errors between phases of the received pilot symbols and the transmitted pilot signals. Phase noise on the data symbols is then estimated (240) using an interpolation of the phase noise on the pilot symbols.

For example, the interpolating interpolates a set of the phase noise on the pilot symbols (230) using an interpolation function, wherein the size of the set is selected based on a type of the interpolation function. This interpolation function may include a nearest neighbor interpolation function, a linear interpolation function, a polynomial interpolation function, or combination thereof.

This estimate is then used to correct the phase noise on the data symbols (250) to produce a filtered signal with an equalized phase, which may be then used ford demodulation and decoding (295) to produce an estimate of the transmitted optical signal.

Figure 2B:
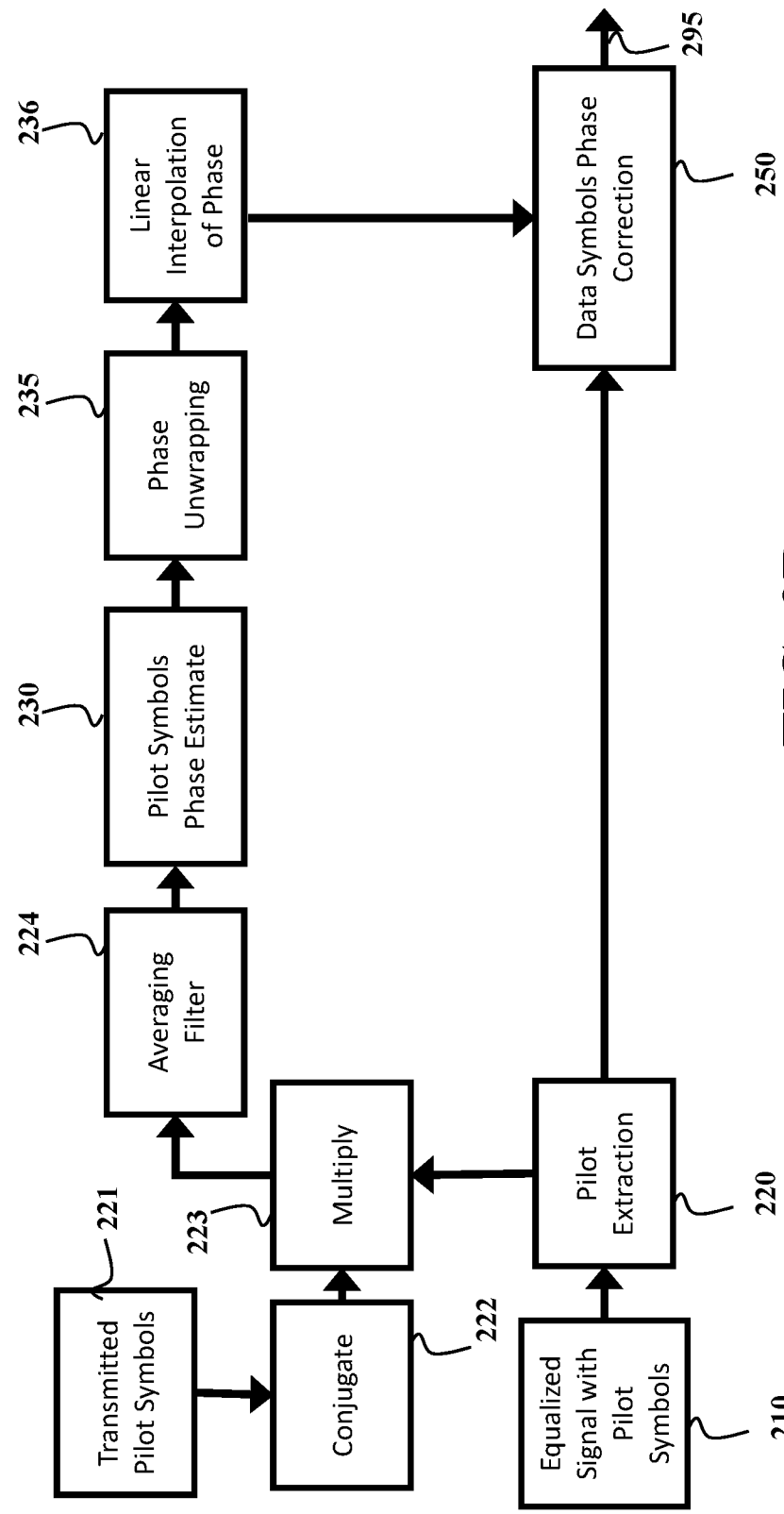
FIG. 2B is a block diagram of a method for estimating carrier phase using only the pilot symbols according to some embodiments of the invention.

FIG. 2B shows an example of a system whereby carrier phase is estimated using only the pilot symbols as described in this invention. Pilot symbols are extracted 220 from the equalized signal 210 which contains both pilot symbols and data symbols, and is corrupted by phase noise. Transmitted pilot symbols 221 are first conjugated 222, before being multiplied 223 with the received pilot symbols.

For example, the most likely phase noise on each pilot symbol is determined as a complex argument (230) of an average (224) of a product (223) of the received pilot symbol (220) and a complex conjugate (222) of the transmitted pilot symbol (221). The averaging filter may be omitted or shortened in the case of high levels of phase noise, or of desire for extremely low complexity.

In the case where the averaging filter (224) is used, the length and/or coefficients of the averaging filter may be optimized for performance as a function of one or a combination of signal-to-noise ratio of the optical channel and a level of phase noise in the optical channel. Lower signal-to-noise ratios would make advantageous a lower filter bandwidth, or longer filter, while higher levels of phase noise would make advantageous a higher filter bandwidth, or shorter filter.

This sequence of phases is then unwrapped 235, as the previous operation of estimating the phase 230 provides phases which are bounded on some interval and therefore have some ambiguity. The carrier phase on the data symbols is then inferred from the phase estimated on the pilot symbols using some knowledge of the channel information, the pilot symbol phase estimates and some interpolation algorithm, such as linear interpolation 236. The data symbols are then corrected using this estimated carrier phase 250 to produce an output 295 which is used subsequently for operations such as demodulation and decoding.

Phase Estimation Using Pilot Symbols and Data Symbols

Some of these embodiments are based on the realization that the estimated phase provided by using only pilot symbols may be improved by the use of a second stage which uses the data symbols in addition to the initially estimated phase. The pilot symbol only phase estimator is well suited to providing a coarse estimate of carrier phase, as it can estimate phase without ambiguity (that is, an unwrapped phase estimate), and low complexity and latency. This initial estimate can then be refined by a second stage utilizing the data symbols.

Figure 3A:
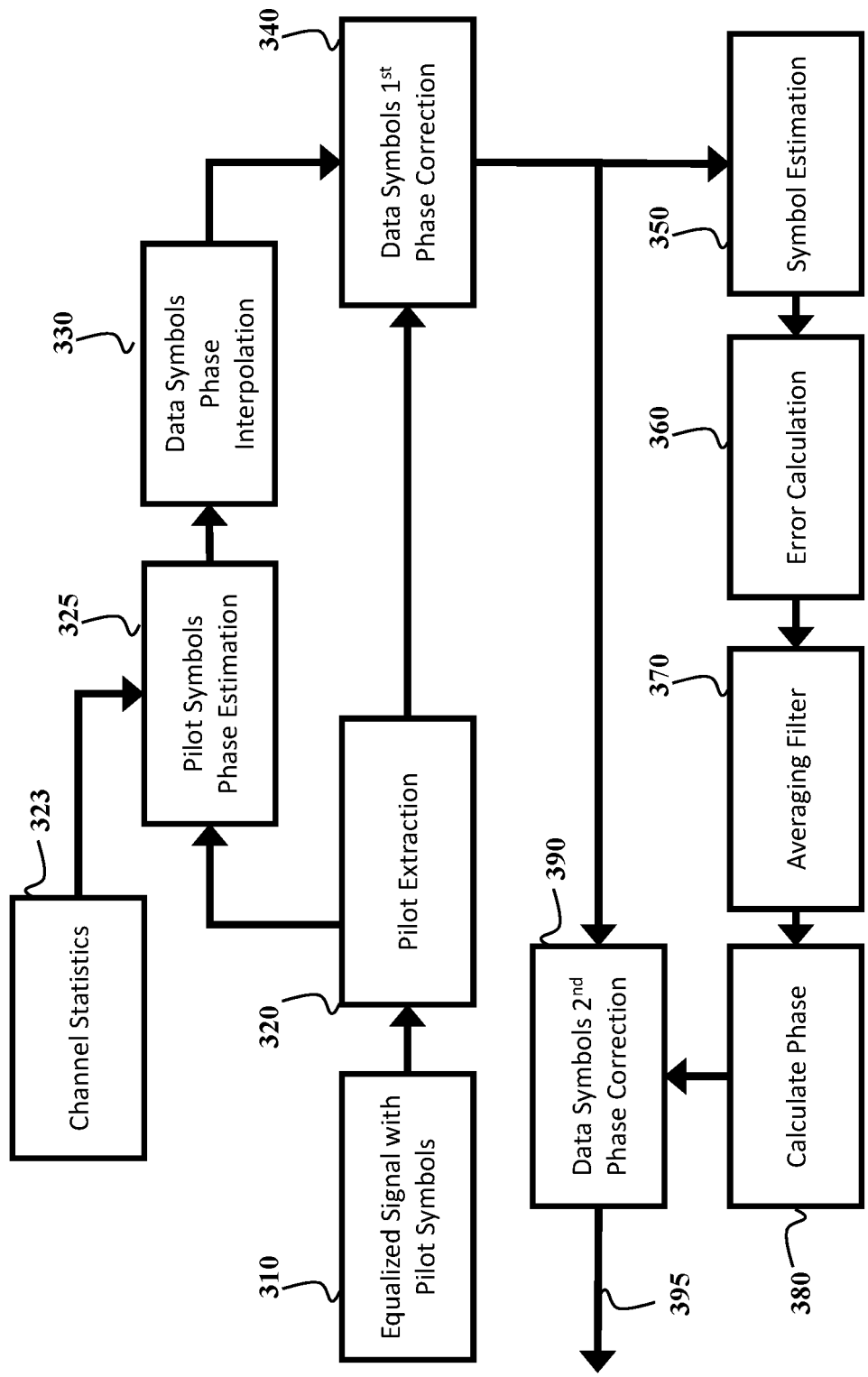
FIG. 3A is a block diagram of a method for estimating carrier phase in a two stage process using both pilot symbols and information contained on the data symbols, according to some embodiments of the invention.

FIG. 3A shows a schematic of a two stage carrier phase estimation method, using a first stage which relies only on the pilot symbols, determining a residual error between a phase of the received data symbol with equalized phase and a phase of the most likely transmitted data symbol given the received data symbol with equalized phase, and a second stage which utilizes the output of the first stage, and the phases and amplitudes of the data symbols, refining the estimate of the phase noise on the data symbols based on the residual error.

An input signal (310) comprises data symbols and pilot symbols distorted by carrier phase noise. Pilot symbols are then extracted (320), before the carrier phase of the pilot symbols is estimated (325) with the aid of the channel statistics (323).

For example, the phase noise on the pilot symbols are estimated (325) as most likely phase noise on the pilot symbols using a statistical probability distribution of phase noise on the optical channel (323) and errors between phases of the received pilot symbols and the transmitted pilot signals (320).

The carrier phase of the data symbols is then inferred (330) from the phase on the pilot symbols, and the data symbols corrected with this initial carrier phase estimate (340). Symbols are then estimated (350) based on this set of symbols with initial corrections (340), before a residual error is calculated (360) and averaged (370). This averaged error is then used to calculate the residual phase (380) which is then applied to the set of data symbols after the first phase estimate was applied (340), and sent onward for further processing (395).

Figure 3B:
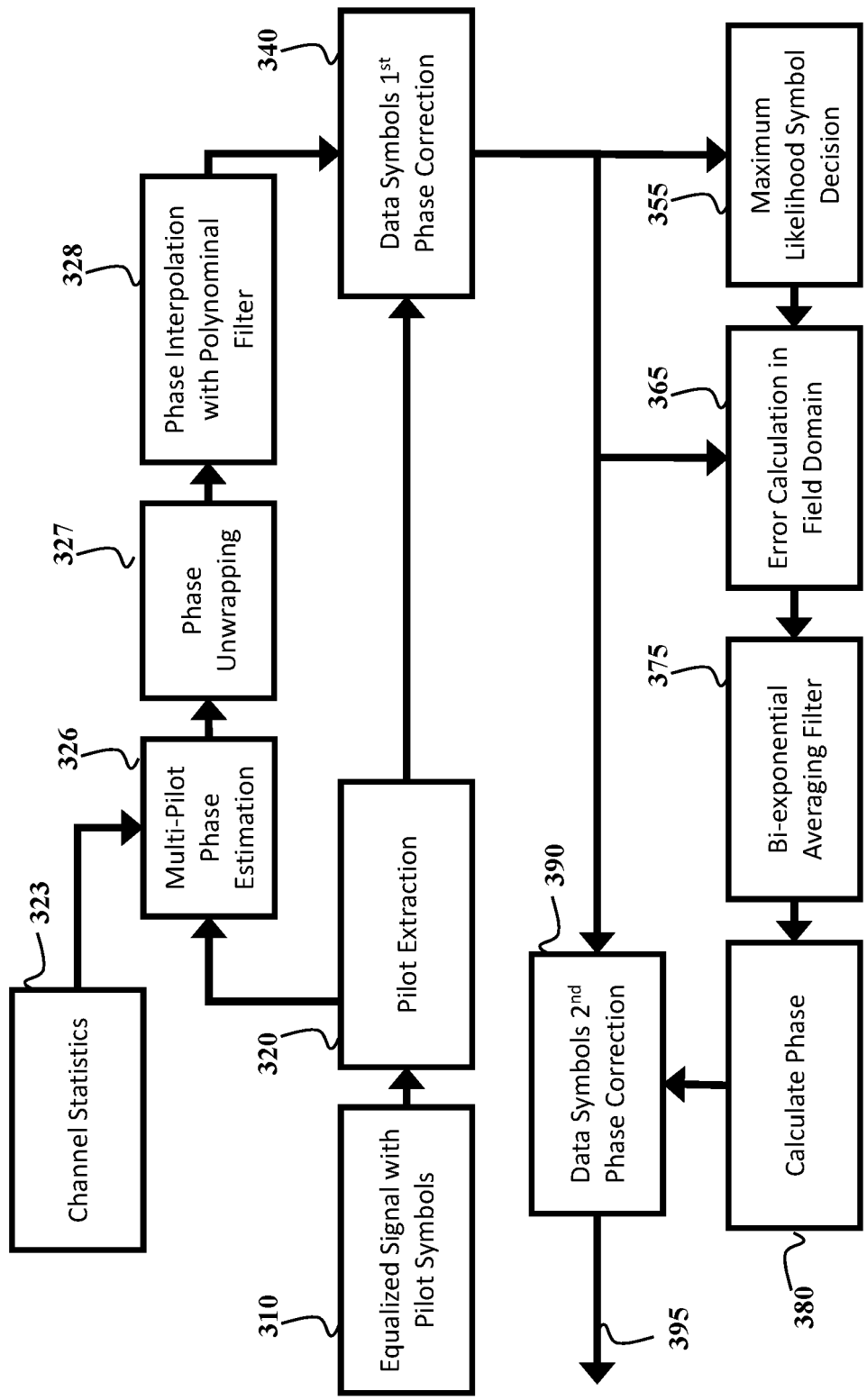
FIG. 3B is a block diagram of a method for estimating carrier phase in a two stage process using both pilot symbols and information contained on the data symbols, according to some embodiments of the invention.

FIG. 3B shows a schematic of a two stage carrier phase estimation method, according to some embodiments of the invention. An input signal (310) comprises data symbols and pilot symbols distorted by carrier phase noise. Pilot symbols are then extracted (320), before the carrier phase at the pilot symbols is estimated (326) using information from multiple pilot symbols, with the aid of the channel statistics (323). These sets of phase estimates are then unwrapped (327), before being interpolated with a polynomial filter (328) to produce an estimate on the data symbols, which is then used to provide a first stage phase correction (340). In the second stage, maximum-likelihood decisions are performed (355) on the data symbols after the first stage phase correction (340), and errors calculated in the field domain (365). The error is then averaged using a bi-exponential filter (375), the result of which is then used to calculate the phase (380) on the data symbols for the second stage estimator. This phase error is then corrected for (390), and the resulting signal sent onward for further processing (395).

For example, the residual error is calculated as a complex argument (380) of an average (375) of a product of the received data symbol (365) with equalized phase and the most likely transmitted data symbol (355). The averaging filter (375) is an optional element, which may be advantageous in conditions with low SNR, or high symbol error rate. It may be omitted when desired complexity is extremely low, or SNR is high.

In the case that the averaging filter (375) is used, at least one of a length and coefficients of the averaging filter may be optimized as a function of one or combination of a signal-to-noise ratio of the optical channel and a level of phase noise in the optical channel. When the channel statistics are not accurately known, some embodiments determine filtering coefficients for the averaging filter (375) based on an error between amplitudes of the received pilot symbols and amplitudes of transmitted pilot symbols, while ignoring errors between phases of the received pilot symbols and phases of the transmitted pilot symbols.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for decoding an optical signal transmitted over an optical channel from a transmitter to a receiver, comprising:
   receiving the transmitted optical signal;
   producing, from the transmitted optical signal, a digital signal including received data symbols and received pilot symbols;
   determining values of phase noise on the pilot symbols as most likely phase noise using a statistical probability distribution of phase noise on the optical channel and errors between phases of the received pilot symbols and the transmitted pilot symbols;
   estimating phase noise on the data symbols using an interpolation of the phase noise on the pilot symbols;
   compensating the digital signal with the phase noise on the data symbols to produce a filtered signal with an equalized phase; and
   demodulating and decoding the filtered signal to produce an estimate of the transmitted optical signal, wherein at least some steps of the method are performed using a processor of the receiver.

2. The method of claim 1, wherein the most likely phase noise on each pilot symbol is determined as a complex argument of a product of the received pilot symbol and a complex conjugate of the transmitted pilot symbol.

3. The method of claim 1, wherein the most likely phase noise on each pilot symbol is determined as a complex argument of an average of a product of the received pilot symbol and a complex conjugate of the transmitted pilot symbol.

4. The method of claim 3, further comprising:
   determining a length and coefficients of an averaging filter for determining the average of the product of the received pilot symbol and the complex conjugate of the transmitted pilot symbol as a function of one or combination of a signal-to-noise ratio of the optical channel and a level of phase noise in the optical channel.

5. The method of claim 1, wherein the interpolating interpolates a set of the phase noise on the pilot symbols using an interpolation function, wherein the size of the set is selected based on a type of the interpolation function.

6. The method of claim 5, wherein the type of the interpolation function includes a nearest neighbor interpolation function, a linear interpolation function, a polynomial interpolation function, or combination thereof.

7. The method of claim 1, further comprising:
   determining a residual error between a phase of the received data symbol with equalized phase and a phase of the most likely transmitted data symbol given the received data symbol with equalized phase; and
   refining the estimate of the phase noise on the data symbols based on the residual error.

8. The method of claim 7, wherein the residual error is determined as a complex argument of a product of the received data symbol with equalized phase and the most likely transmitted data symbol.

9. The method of claim 7, wherein the residual error as a complex argument of an average of a product of the received data symbol with equalized phase and the most likely transmitted data symbol.

10. The method of claim 9, further comprising:
determining a length and coefficients of an averaging filter for determining the average of the product of the received data symbol with equalized phase and the most likely transmitted data symbol as a function of one or combination of a signal-to-noise ratio of the optical channel and a level of phase noise in the optical channel.

11. The method of claim 9, further comprising:
determining filtering coefficients based on an error between amplitudes of the received pilot symbols and amplitudes of transmitted pilot symbols, while ignoring errors between phases of the received pilot symbols and phases of the transmitted pilot symbols; and
equalizing amplitude of the digital signal according to the filtering coefficients.

12. A receiver for decoding an optical signal transmitted by a transmitter over an optical channel, comprising:
a front end configured to receive the transmitted optical signal to produce a digital signal including data symbols and pilot symbols;
a phase equalizer configured to
determine values of phase noise on the pilot symbols as most likely phase noise using a statistical probability distribution of phase noise on the optical channel and errors between phases of the received pilot symbols and the transmitted pilot symbols;
determine phase noise on the data symbols using interpolation of the phase noise on the pilot symbols; and
compensate the phase noise on the data symbols in the digital signal with to produce a filtered signal with an equalized phase; and
a decoder to demodulate and decode the filtered signal to produce an estimate of the transmitted optical signal.

13. The receiver of claim 12, wherein the phase equalizer determines the phase noise on the pilot symbols using a statistical probability distribution of phase noise on the optical channel and errors between phases of the received pilot symbols and the transmitted pilot signals.

14. The receiver of claim 13, wherein the most likely phase noise on each pilot symbol is determined as a complex argument of a product or an average of a product of the received pilot symbol and a complex conjugate of the transmitted pilot symbol.

15. The receiver of claim 12, wherein the interpolating is performed using an interpolation function including a nearest neighbor interpolation function, a linear interpolation function, a polynomial interpolation function, or combination thereof.

16. The receiver of claim 12, wherein the phase equalizer is configured to
determine a residual error between a phase of the received data symbol with equalized phase and a phase of the most likely transmitted data symbol given the received data symbol with equalized phase; and
refine the estimate of the phase noise on the data symbols based on the residual error.

17. The receiver of claim 16, wherein the residual error is determined as a complex argument of a product or an average of a product of the received data symbol with equalized phase and the most likely transmitted data symbol.

18. The receiver of claim 12, further comprising:
an amplitude equalizer to determine filtering coefficients based on an error between amplitudes of the received pilot symbols and amplitudes of transmitted pilot symbols, while ignoring errors between phases of the received pilot symbols and phases of the transmitted pilot symbols and to equalize amplitudes of the digital signal according to the filtering coefficients.

19. A non-transitory computer readable storage medium embodied thereon a program executable by a processor for performing a method, the method comprising:
receiving a digital signal representing an optical signal transmitted over an optical channel, the digital signal including received data symbols and received pilot symbols;
determining values of phase noise on the pilot symbols as most likely phase noise using a statistical probability distribution of phase noise on the optical channel and errors between phases of the received pilot symbols and the transmitted pilot symbols;
estimating phase noise on the data symbols using an interpolation of the phase noise on the pilot symbols;
compensating the digital signal with the phase noise on the data symbols to produce a filtered signal with an equalized phase; and
demodulating and decoding the filtered signal to produce an estimate of the transmitted optical signal.

* * * * *